No. 734,946. PATENTED JULY 28, 1903.
L. B. PRAHAR.
HANDLE FOR TOILET ARTICLES.
APPLICATION FILED DEC. 15, 1902.
NO MODEL.
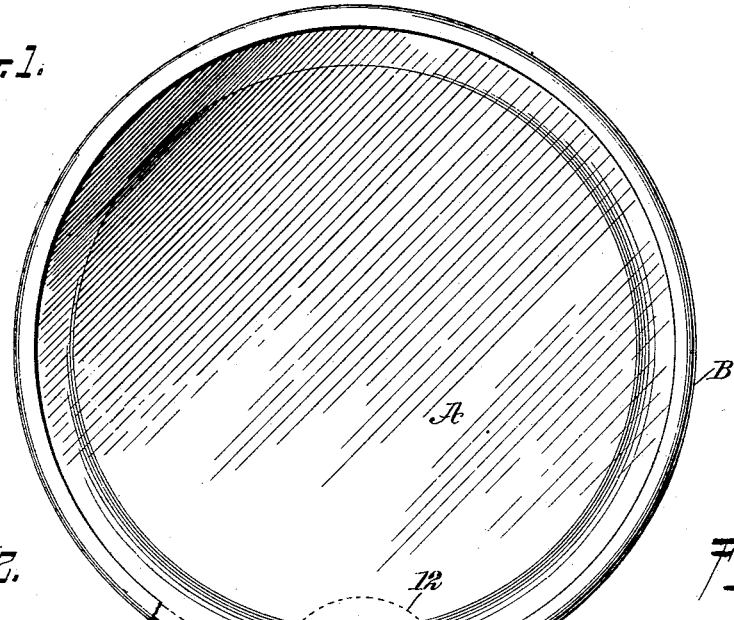
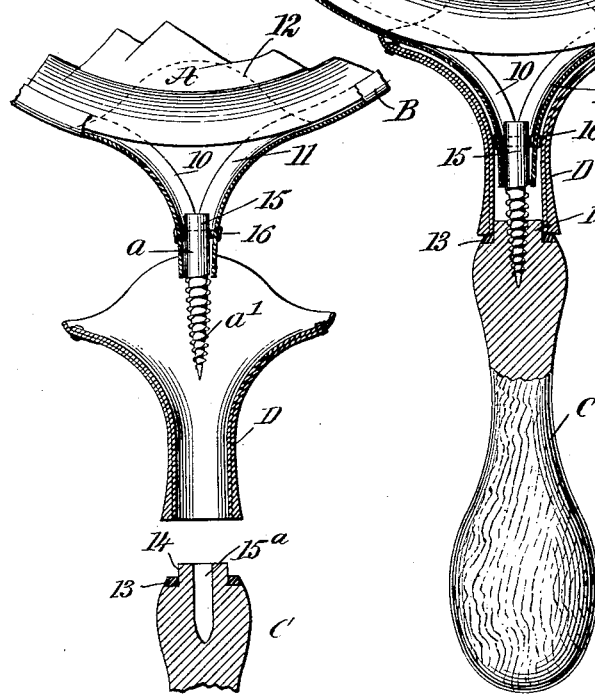
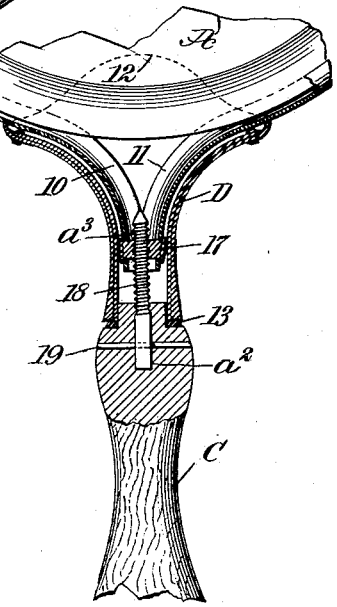
WITNESSES:
William P. Goebel
Fred Acker
INVENTOR
Louis B. Prahar
BY Munn
ATTORNEYS.

No. 734,946.  
Patented July 28, 1903.

UNITED STATES PATENT OFFICE.

LOUIS B. PRAHAR, OF NEW YORK, N. Y.

HANDLE FOR TOILET ARTICLES.

SPECIFICATION forming part of Letters Patent No. 734,946, dated July 28, 1903.

Application filed December 15, 1902. Serial No. 135,268. (No model.)

*To all whom it may concern:*

Be it known that I, LOUIS B. PRAHAR, a citizen of the United States, and a resident of the city of New York, borough of Brooklyn, in the county of Kings and State of New York, have invented a new and Improved Handle for Toilet Articles, of which the following is a full, clear, and exact description.

The purpose of the invention is to provide a simple, economic, and effective means for connecting mirrors and the like to their handles without detracting from the strength of the handle and so that the handle may be quickly applied and removed when desired, the act of applying the handle causing the band for the mirror or other article to be drawn tightly around the same and to bear at its inner or lower central portion against a ferrule, which ferrule in its turn is pressed toward the article clamped by the handle, with which it engages when the latter is tightened.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of a mirror and a sectional front elevation of an improved handle and parts connected therewith for holding the mirror in position. Fig. 2 is a sectional view representing a portion of a mirror and the clamping-band, the ferrule and the handle, the band, ferrule, and handle being shown separated; and Fig. 3 is a sectional side elevation of a mirror and its handle-support, illustrating a slight departure in the manner of connecting the clamping-band and handle.

A represents a mirror, and B a clamping-band, which band is grooved at its inner portion to receive and span the marginal edge of the mirror; but the said band at its central lower portion is divided, and its ends are carried downward in branches 10 and 11 below the mirror, terminating at a point above the handle C. The clamping-band at no point enters the said handle at any time.

A ferrule D surrounds the branches 10 and 11 of the band B, and the said ferrule engages at its upper edge with the clamping-band B at the outer sides of the branches 10 and 11 of said band. Preferably the ferrule D is provided with an upper extension 12 at one or both faces, which extensions 12 are carried up to an engagement with the mirror A or other article clamped by the band B. Preferably the extension 12 is at the rear only of the mirror or other article clamped; but the ferrule D is of such shape and construction that when in place it completely conceals the space which exists between the branches 10 and 11 of the clamping-band B. The lower end of the ferrule D is shown as resting upon a washer 13, formed in the rabbeted upper edge 14 of the handle; but the said washer may be dispensed with, if found desirable. The handle may be made without a rabbet at its upper end; but the rabbeted construction is preferred. The ferrule D in any event has bearing at its lower end on the upper portion of the handle C, so that when the handle C is attached to the clamping-band B said handle serves to hold the ferrule D in position as it forces the said ferrule to an engagement with the aforesaid clamping-band.

The attachment between the clamping-band B and the handle C is effected through the medium of a screw. In Figs. 1 and 2 the head-section $a$ of the screw 15 is made to enter the space between the lower ends of the branches 10 and 11 of the clamping-band, which branches are brought to a close engagement with the head $a$ of the said screw 15 and are held in such position by a rivet 16 or its equivalent passed through the branches 10 and 11 and through the head $a$ of the said screw, while the threaded portion $a'$ of the screw 15 is adapted to enter the upper central portion of the handle C, which upper central portion of the handle may be and preferably is provided with a longitudinal opening or recess $15^a$ to receive the aforesaid threaded portion of the screw 15 or the major portion of the same; but this opening $15^a$ when employed in the handle is of less diameter than the diameter of the central portion of the threaded section of the screw. Under this construction it will be observed that when the handle is turned in engagement with the threaded portion of the screw 15 the clamping-band B is drawn tightly around the article which it surrounds and the ferrule D is held snugly in its desired position, engaging with the lower portion of the clamping-band and the upper portion of the handle.

In Fig. 3 I have illustrated a slight departure in the means for connecting the handle with a clamping-band B; but the screw is still employed, the position of the screw being simply reversed—as, for example, the head $a^2$ of the screw 18 is secured in the upper central portion of the handle C by means of a pin 19, rivet, or the like, and the threaded section or portion $a^3$ of the screw extends sufficiently beyond the upper or outer end of the handle C to enter a nut 17, which is rigidly held by pins, rivets, or otherwise at the lower portions of the branches 10 and 11 of the clamping-band, causing the said branches to firmly engage with the said screw. The operation of connecting the various parts when the parts are constructed as shown in Fig. 3 is identical with the action when the parts are constructed as shown in Figs. 1 and 2.

Having thus described my invention, I claim as new and desire to secure by Letters Patent—

1. A handle for toilet articles, consisting of a band-section adapted to embrace the article and provided with branches extending from the article, one in direction of the other, a handle independent of said branches, a ferrule engaging with the handle and surrounding the branches of the said band-section, a space intervening the terminal end of the branches and the upper end of the handle, and a fastening device between the handle and the branches of the said band, which fastening device is contained within the said ferrule, as and for the purpose described.

2. A handle for toilet articles, consisting of a band-section adapted to embrace the article and provided with branches extending from the article in direction of each other, a solid handle, the said handle at its upper end having a space between it and the lower ends of the branches of the band, a ferrule within which the said branches of the band are located, and a screw fastening connection between the upper portion of the handle and the branches of the said band, the said screw connection being within the said ferrule, as and for the purpose described.

In testimony whereof I have signed my name to this specification in the presence of two subscribing witnesses.

LOUIS B. PRAHAR.

Witnesses:
JNO. M. RITTER,
J. FRED. ACKER.